US011057685B2

(12) United States Patent
Taylor et al.

(10) Patent No.: US 11,057,685 B2
(45) Date of Patent: Jul. 6, 2021

(54) MEDIA CONTENT PROOF OF PLAY OVER OPTICAL MEDIUM

(71) Applicant: NCR Corporation, Duluth, GA (US)

(72) Inventors: Jeremy Cyle Taylor, Cumming, GA (US); Nicholas Caine, Gainesville, GA (US); David Alan Meier, College Station, TX (US)

(73) Assignee: NCR Corporation, Atlanta, GA (US)

( * ) Notice: Subject to any disclaimer, the term of this patent is extended or adjusted under 35 U.S.C. 154(b) by 244 days.

(21) Appl. No.: 15/940,754

(22) Filed: Mar. 29, 2018

(65) Prior Publication Data

US 2019/0306588 A1    Oct. 3, 2019

(51) Int. Cl.
*H04N 21/8358*    (2011.01)
*H04N 21/2389*    (2011.01)
*G06T 1/00*    (2006.01)

(52) U.S. Cl.
CPC ....... *H04N 21/8358* (2013.01); *G06T 1/0021* (2013.01); *H04N 21/23892* (2013.01); *G06T 2201/0053* (2013.01); *G06T 2201/0083* (2013.01)

(58) Field of Classification Search
CPC .......... H04N 21/8358; H04N 21/23892; G06T 1/0021; G06T 2201/0053; G06T 2201/0083
USPC ....................................................... 713/176
See application file for complete search history.

(56) References Cited

U.S. PATENT DOCUMENTS

| 6,411,725 | B1 * | 6/2002 | Rhoads | G10L 19/018 |
| | | | | 382/100 |
| 6,580,806 | B1 * | 6/2003 | Sato | G06T 1/0021 |
| | | | | 380/277 |
| 6,771,794 | B1 * | 8/2004 | Osaka | G06T 1/0021 |
| | | | | 380/216 |
| 6,785,399 | B2 * | 8/2004 | Fujihara | G06T 1/0021 |
| | | | | 375/E7.018 |
| 6,829,368 | B2 * | 12/2004 | Meyer | G06T 1/0021 |
| | | | | 348/E7.071 |
| 6,944,771 | B2 * | 9/2005 | Epstein | G06T 1/0021 |
| | | | | 380/201 |
| 6,947,571 | B1 * | 9/2005 | Rhoads | G06Q 30/02 |
| | | | | 382/100 |
| 6,950,519 | B2 * | 9/2005 | Rhoads | G06T 1/0021 |
| | | | | 345/629 |

(Continued)

Primary Examiner — Michael S McNally
(74) Attorney, Agent, or Firm — Schwegman, Lundberg & Woessner

(57) ABSTRACT

Methods and a System are provided for proving media content was played on a display through capturing of audit information presented in watermarks when the content is played on the display. In a method, content watermarks are generated for content that is to be rendered on a display of a display device. An image sensor that is externally affixed to a corner of the display captures the watermarks as the content is rendered on the display, the image sensor captures the watermarks being played with the content from the area associated the corner where the image sensor is affixed. The image sensor captures the watermarks as images and streams the images back to the display device for storage. The stored watermarks are processed to verify that the corresponding content associated with the watermarks was played by the display device (visually rendered on the display of the display device).

17 Claims, 4 Drawing Sheets

(56) References Cited

U.S. PATENT DOCUMENTS

| | | | | |
|---|---|---|---|---|
| 6,961,444 B2* | 11/2005 | Levy | G06T 1/0028 | 348/463 |
| 6,965,697 B1* | 11/2005 | Kondo | G06T 1/0028 | 375/E7.255 |
| 6,993,152 B2* | 1/2006 | Patterson | H04N 21/8358 | 382/100 |
| 6,993,154 B2* | 1/2006 | Brunk | G06T 1/0071 | 348/E17.003 |
| 7,003,131 B2* | 2/2006 | Watson | G06T 1/0035 | 283/113 |
| 7,006,661 B2* | 2/2006 | Miller | H04N 1/32352 | 382/100 |
| 7,020,349 B2* | 3/2006 | Brunk | G06T 1/0071 | 348/E17.003 |
| 7,042,470 B2* | 5/2006 | Rhoads | G01C 11/00 | 345/634 |
| 7,050,603 B2* | 5/2006 | Rhoads | G11B 20/00086 | 382/100 |
| 7,061,510 B2* | 6/2006 | Rhoads | G01C 11/00 | 345/634 |
| 7,098,931 B2* | 8/2006 | Patterson | G01C 11/00 | 345/634 |
| 7,099,491 B2* | 8/2006 | Takaku | H04N 7/17318 | 348/E7.071 |
| 7,099,492 B2* | 8/2006 | Rhoads | G01C 11/00 | 382/100 |
| 7,181,044 B2* | 2/2007 | Watson | G06T 1/0035 | 380/51 |
| 7,181,625 B2* | 2/2007 | Peled | G06F 21/10 | 382/100 |
| 7,184,572 B2* | 2/2007 | Rhoads | G01C 11/00 | 382/100 |
| 7,197,160 B2* | 3/2007 | Rhoads | G06T 1/0021 | 382/100 |
| 7,197,164 B2* | 3/2007 | Levy | G06T 1/0028 | 348/463 |
| 7,224,819 B2* | 5/2007 | Levy | G07D 7/0034 | 382/100 |
| 7,248,715 B2* | 7/2007 | Levy | G06Q 10/087 | 382/100 |
| 7,248,717 B2* | 7/2007 | Rhoads | G06K 7/1417 | 382/100 |
| 7,254,249 B2* | 8/2007 | Rhoads | G01C 11/00 | 382/100 |
| 7,286,685 B2* | 10/2007 | Brunk | G06T 1/0071 | 358/534 |
| 7,333,957 B2* | 2/2008 | Levy | G06K 19/06037 | 705/58 |
| 7,349,552 B2* | 3/2008 | Levy | G06T 1/0021 | 382/100 |
| 7,373,513 B2* | 5/2008 | Levy | H04N 1/32251 | 713/176 |
| 7,436,976 B2* | 10/2008 | Levy | H04N 1/32208 | 382/100 |
| 7,444,392 B2* | 10/2008 | Rhoads | B42D 25/333 | 709/219 |
| 7,454,035 B2* | 11/2008 | Miller | G06F 16/955 | 382/100 |
| 7,460,726 B2* | 12/2008 | Levy | G06T 1/0028 | 382/240 |
| 7,499,566 B2* | 3/2009 | Rhoads | G06T 1/0021 | 382/100 |
| 7,502,489 B2* | 3/2009 | Rhoads | G06T 1/0021 | 382/100 |
| 7,502,490 B2* | 3/2009 | Rhoads | G06T 1/0021 | 382/100 |
| 7,505,605 B2* | 3/2009 | Rhoads | G06K 19/06037 | 382/100 |
| 7,564,992 B2* | 7/2009 | Rhoads | G06K 7/1417 | 382/100 |
| 7,577,273 B2* | 8/2009 | Rhoads | G06K 19/06037 | 382/100 |
| 7,577,841 B2* | 8/2009 | Celik | G06T 1/0085 | 283/113 |
| 7,587,601 B2* | 9/2009 | Levy | G06F 21/10 | 713/150 |
| 7,590,259 B2* | 9/2009 | Levy | G06K 19/06046 | 382/100 |
| 7,593,576 B2* | 9/2009 | Meyer | G06T 1/0021 | 382/190 |
| 7,602,977 B2* | 10/2009 | Rhoads | H04N 1/32144 | 382/232 |
| 7,602,978 B2* | 10/2009 | Levy | G07D 7/0034 | 382/232 |
| 7,620,253 B2* | 11/2009 | Miller | B42D 25/333 | 382/232 |
| 7,643,649 B2* | 1/2010 | Davis | G06K 19/18 | 382/100 |
| 7,650,008 B2* | 1/2010 | Rhoads | G01C 11/00 | 382/100 |
| 7,650,010 B2* | 1/2010 | Levy | H04H 60/82 | 382/100 |
| 7,693,965 B2* | 4/2010 | Rhoads | G07F 7/08 | 709/219 |
| 7,738,711 B2* | 6/2010 | Kondo | G06T 1/0028 | 382/232 |
| 7,742,618 B2* | 6/2010 | Srinivasan | G06T 1/0085 | 382/100 |
| 7,848,540 B2* | 12/2010 | Srinivasan | G06T 1/0085 | 382/100 |
| 7,856,116 B2* | 12/2010 | Rodriguez | G06K 9/22 | 382/100 |
| 7,861,276 B2* | 12/2010 | Moroo | H04H 20/28 | 725/113 |
| 7,949,147 B2* | 5/2011 | Rhoads | G06K 9/00442 | 382/100 |
| 7,949,149 B2* | 5/2011 | Rhoads | H04N 1/32251 | 382/100 |
| 7,961,949 B2* | 6/2011 | Levy | G06K 19/06046 | 382/190 |
| 7,970,167 B2* | 6/2011 | Rhoads | G06K 7/1417 | 382/100 |
| 7,978,874 B2* | 7/2011 | Levy | H04N 19/467 | 382/100 |
| 7,986,806 B2* | 7/2011 | Rhoads | G06K 7/1447 | 382/100 |
| 7,986,845 B2* | 7/2011 | Miller | H04N 1/32208 | 382/232 |
| 8,000,495 B2* | 8/2011 | Levy | G06T 1/0035 | 382/100 |
| 8,010,632 B2* | 8/2011 | Rhoads | G07D 7/004 | 709/219 |
| 8,023,691 B2* | 9/2011 | Rodriguez | G06T 1/0064 | 382/100 |
| 8,023,694 B2* | 9/2011 | Rhoads | G06T 1/0021 | 382/100 |
| 8,027,506 B2* | 9/2011 | Rhoads | G06T 1/0021 | 382/100 |
| 8,027,520 B2* | 9/2011 | Rhoads | G06K 9/00442 | 382/115 |
| 8,036,418 B2* | 10/2011 | Meyer | G06T 1/0021 | 382/100 |
| 8,036,420 B2* | 10/2011 | Evans | G06F 21/608 | 382/100 |
| 8,045,749 B2* | 10/2011 | Rhoads | G01C 11/00 | 382/100 |
| 8,055,899 B2* | 11/2011 | Levy | G06F 21/10 | 705/57 |
| 8,073,933 B2* | 12/2011 | Rhoads | G07F 7/12 | 709/219 |
| 8,085,976 B2* | 12/2011 | Rhoads | G01C 11/00 | 382/100 |
| 8,087,583 B2* | 1/2012 | Hawes | G11B 20/00884 | 235/380 |
| 8,094,949 B1* | 1/2012 | Rhoads | H04N 1/00424 | 382/232 |
| 8,099,403 B2* | 1/2012 | Levy | G06F 21/10 | 707/705 |

(56) References Cited

U.S. PATENT DOCUMENTS

| | | | | |
|---|---|---|---|---|
| 8,103,879 B2* | 1/2012 | Levy | G06F 21/10 | 713/150 |
| 8,107,674 B2* | 1/2012 | Davis | H04N 1/00037 | 382/100 |
| 8,108,484 B2* | 1/2012 | Rhoads | G06Q 20/20 | 709/217 |
| 8,116,516 B2* | 2/2012 | Rhoads | G06K 7/1417 | 382/100 |
| 8,135,166 B2* | 3/2012 | Rhoads | G01C 11/00 | 382/100 |
| 8,150,032 B2* | 4/2012 | Rhoads | G06K 7/1417 | 380/51 |
| 8,151,113 B2* | 4/2012 | Rhoads | G06F 16/634 | 713/176 |
| 8,165,341 B2* | 4/2012 | Rhoads | H04N 1/32203 | 382/100 |
| 8,189,854 B2* | 5/2012 | Watson | G06T 1/0035 | 382/100 |
| 8,194,919 B2* | 6/2012 | Rodriguez | B42D 25/23 | 382/100 |
| 8,224,022 B2* | 7/2012 | Levy | B42D 25/21 | 382/100 |
| 8,230,226 B2* | 7/2012 | Srinivasan | G10L 19/018 | 713/176 |
| 8,243,980 B2* | 8/2012 | Rhoads | G06K 9/00442 | 382/100 |
| 8,302,143 B2* | 10/2012 | Meuninck | H04N 21/25833 | 725/112 |
| 8,315,554 B2* | 11/2012 | Levy | G11B 20/00181 | 455/3.06 |
| 8,346,567 B2* | 1/2013 | Petrovic | G06T 1/0021 | 380/201 |
| 8,358,703 B2* | 1/2013 | Zou | G06T 1/0035 | 375/240.26 |
| 8,374,383 B2* | 2/2013 | Long | G06K 7/14 | 382/100 |
| 8,392,827 B2* | 3/2013 | Challenger | G06F 16/9577 | 715/255 |
| 8,407,752 B2* | 3/2013 | Levy | H04N 7/17318 | 725/113 |
| 8,442,264 B2* | 5/2013 | Rhoads | H04N 19/20 | 382/100 |
| 8,447,064 B2* | 5/2013 | Rhoads | G01C 11/00 | 382/100 |
| 8,462,982 B2* | 6/2013 | Colaitis | G06T 1/0021 | 382/100 |
| 8,483,426 B2* | 7/2013 | Rhoads | G06K 7/1447 | 382/100 |
| 8,542,868 B2* | 9/2013 | Ballocca | H04N 7/162 | 382/100 |
| 8,543,661 B2* | 9/2013 | Rhoads | G06Q 20/20 | 709/217 |
| 8,548,810 B2* | 10/2013 | Rodriguez | G06T 1/0071 | 382/100 |
| 8,549,307 B2* | 10/2013 | Winograd | G06T 1/005 | 380/200 |
| 8,588,459 B2* | 11/2013 | Bloom | H04N 19/93 | 382/100 |
| 8,607,354 B2* | 12/2013 | Levy | G06F 21/10 | 713/180 |
| 8,626,666 B2* | 1/2014 | Lofgren | G06Q 20/12 | 283/113 |
| 8,681,978 B2* | 3/2014 | Petriovic | G06T 1/0021 | 380/203 |
| 8,683,537 B2* | 3/2014 | Meuninck | H04N 21/858 | 725/112 |
| 8,726,304 B2* | 5/2014 | Petrovic | H04N 21/252 | 725/13 |
| 8,745,403 B2* | 6/2014 | Petrovic | H04N 21/4627 | 713/176 |
| 8,745,404 B2* | 6/2014 | Petrovic | G06F 21/10 | 713/176 |
| 8,781,967 B2* | 7/2014 | Tehranchi | G06T 1/0035 | 380/227 |
| 8,799,659 B2* | 8/2014 | Srinivasan | G10L 19/018 | 380/207 |
| 8,805,689 B2* | 8/2014 | Ramaswamy | G06Q 30/02 | 382/100 |
| 8,806,517 B2* | 8/2014 | Petrovic | H04H 20/14 | 725/9 |
| 8,825,518 B2* | 9/2014 | Levy | G06F 21/125 | 705/14.23 |
| 8,838,979 B2* | 9/2014 | Srinivasan | G10L 19/018 | 713/176 |
| 8,863,165 B2* | 10/2014 | Gordon | H04N 21/254 | 725/19 |
| 8,869,222 B2* | 10/2014 | Winograd | H04N 5/44 | 725/110 |
| 8,879,780 B2* | 11/2014 | Sartor | G06T 1/0021 | 375/240 |
| 8,959,352 B2* | 2/2015 | Levy | H04N 1/3216 | 713/176 |
| 8,976,998 B2* | 3/2015 | Rodriguez | G06T 1/0064 | 382/100 |
| 8,983,116 B1* | 3/2015 | Srinivasan | G10L 19/018 | 382/100 |
| 8,984,574 B2* | 3/2015 | Meuninck | H04N 7/17318 | 725/112 |
| 9,009,482 B2* | 4/2015 | Winograd | G06T 1/005 | 380/200 |
| 9,042,598 B2* | 5/2015 | Ramaswamy | G06Q 30/02 | 382/100 |
| 9,065,683 B2* | 6/2015 | Wolosewicz | G06F 21/10 | |
| 9,106,964 B2* | 8/2015 | Zhao | H04N 21/4784 | |
| 9,117,270 B2* | 8/2015 | Wong | G06F 21/10 | |
| 9,210,208 B2* | 12/2015 | Ramaswamy | H04L 65/4069 | |
| 9,262,794 B2* | 2/2016 | Zhao | G06T 1/0021 | |
| 9,282,366 B2* | 3/2016 | Nielsen | H04N 21/44008 | |
| 9,292,894 B2* | 3/2016 | MacIntosh | G06T 1/0021 | |
| 9,299,120 B2* | 3/2016 | Zou | G06T 1/0035 | |
| 9,380,356 B2* | 6/2016 | McMillan | H04H 60/73 | |
| 9,412,386 B2* | 8/2016 | Rodriguez | G06T 1/0071 | |
| 9,437,201 B2* | 9/2016 | Srinivasan | G10L 19/018 | |
| 9,460,560 B2* | 10/2016 | Rodriguez | G06F 3/011 | |
| 9,471,950 B2* | 10/2016 | Park | G06T 1/0021 | |
| 9,497,341 B2* | 11/2016 | Rhoads | G06F 3/002 | |
| 9,514,503 B2* | 12/2016 | Ramaswamy | G06Q 30/02 | |
| 9,515,904 B2* | 12/2016 | Besehanic | H04N 21/8358 | |
| 9,524,584 B2* | 12/2016 | Rodriguez | G06F 3/011 | |
| 9,578,289 B2* | 2/2017 | Roberts | G06Q 50/182 | |
| 9,578,360 B2* | 2/2017 | Weidenfeller | H04N 21/44008 | |
| 9,589,296 B1* | 3/2017 | Li | G06Q 30/0641 | |
| 9,596,521 B2* | 3/2017 | Winograd | H04N 21/437 | |
| 9,648,282 B2* | 5/2017 | Petrovic | H04H 20/14 | |
| 9,661,397 B2* | 5/2017 | Kim | H04N 21/8458 | |
| 9,681,204 B2* | 6/2017 | McMillan | H04N 21/44222 | |
| 9,718,296 B2* | 8/2017 | Rodriguez | G07D 7/0051 | |
| 9,788,043 B2* | 10/2017 | Davis | H04N 5/765 | |
| 9,792,661 B2* | 10/2017 | Rodriguez | G06T 1/0021 | |
| 9,838,281 B2* | 12/2017 | Besehanic | H04N 21/6582 | |
| 9,854,331 B2* | 12/2017 | Winograd | H04N 21/44204 | |
| 9,854,332 B2* | 12/2017 | Winograd | H04N 21/435 | |
| 9,860,611 B2* | 1/2018 | Kim | H04N 21/8458 | |
| 9,942,602 B2* | 4/2018 | Petrovic | G10L 19/018 | |
| 9,967,600 B2* | 5/2018 | Bause | H04N 21/8358 | |
| 9,986,282 B2* | 5/2018 | MacIntosh | G06T 1/0021 | |
| 10,009,663 B1* | 6/2018 | Hoffman | H04N 21/4394 | |
| 10,074,149 B2* | 9/2018 | Meuninck | H04N 21/25833 | |
| 10,110,971 B2* | 10/2018 | Winograd | H04N 21/44008 | |
| 10,158,926 B1* | 12/2018 | Hoffman | H04N 21/4394 | |
| 10,178,443 B2* | 1/2019 | Petrovic | H04N 21/8358 | |
| 10,277,959 B2* | 4/2019 | Winograd | H04N 21/4722 | |
| 10,325,337 B2* | 6/2019 | Meuninck | H04N 19/467 | |
| 10,334,285 B2* | 6/2019 | Hohl | H04N 21/812 | |
| 10,341,734 B2* | 7/2019 | Gordon | H04N 21/812 | |
| 10,354,354 B2* | 7/2019 | Zhao | H04N 5/08 | |
| 10,445,848 B2* | 10/2019 | Petrovic | H04N 21/4627 | |
| 10,499,120 B2* | 12/2019 | Winograd | H04N 21/2668 | |
| 10,504,200 B2* | 12/2019 | Winograd | H04L 67/2804 | |
| 10,506,291 B2* | 12/2019 | Gordon | H04N 21/6581 | |

(56) References Cited

U.S. PATENT DOCUMENTS

| | | | |
|---|---|---|---|
| 10,543,711 B2* | 1/2020 | Rodriguez | G07D 7/0051 |
| 10,575,068 B2* | 2/2020 | Hazan | G06F 21/16 |
| 2002/0021601 A1* | 2/2002 | Chornenky | G07C 9/00111 |
| | | | 365/200 |
| 2002/0090114 A1* | 7/2002 | Rhoads | G07C 9/253 |
| | | | 382/100 |
| 2003/0138127 A1* | 7/2003 | Miller | G06T 1/0057 |
| | | | 382/100 |
| 2004/0218782 A1* | 11/2004 | Brunk | G06K 15/1889 |
| | | | 382/100 |
| 2004/0258273 A1* | 12/2004 | Brunk | G06T 1/0071 |
| | | | 382/100 |
| 2005/0008190 A1* | 1/2005 | Levy | G06K 19/18 |
| | | | 382/100 |
| 2005/0210526 A1* | 9/2005 | Levy | H04N 21/8586 |
| | | | 725/113 |
| 2005/0251683 A1* | 11/2005 | Levy | H04N 21/2541 |
| | | | 713/176 |
| 2006/0133645 A1* | 6/2006 | Rhoads | G06F 16/955 |
| | | | 382/100 |
| 2006/0210108 A1* | 9/2006 | Brunk | G06K 15/00 |
| | | | 382/100 |
| 2007/0053549 A1* | 3/2007 | Miller | G06T 1/0028 |
| | | | 382/100 |
| 2007/0174624 A1* | 7/2007 | Wolosewicz | H04N 21/4331 |
| | | | 713/176 |
| 2007/0192872 A1* | 8/2007 | Rhoads | G06F 3/017 |
| | | | 726/26 |
| 2008/0025561 A1* | 1/2008 | Rhoads | G06T 1/0021 |
| | | | 382/100 |
| 2008/0279536 A1* | 11/2008 | Levy | G06K 19/06037 |
| | | | 386/252 |
| 2009/0074241 A1* | 3/2009 | Miller | G06F 16/955 |
| | | | 382/100 |
| 2009/0129627 A1* | 5/2009 | Levy | G07F 7/086 |
| | | | 382/100 |
| 2009/0158318 A1* | 6/2009 | Levy | H04N 21/8358 |
| | | | 725/32 |
| 2009/0262975 A1* | 10/2009 | Rhoads | G06K 7/1417 |
| | | | 382/100 |
| 2010/0067737 A1* | 3/2010 | Miller | G10L 19/018 |
| | | | 382/100 |
| 2010/0226525 A1* | 9/2010 | Levy | H04N 21/835 |
| | | | 382/100 |
| 2011/0194730 A1* | 8/2011 | Rhoads | G11B 20/00086 |
| | | | 382/100 |
| 2012/0030041 A1* | 2/2012 | Wolosewicz | H04L 12/66 |
| | | | 705/14.73 |
| 2012/0117584 A1* | 5/2012 | Gordon | H04N 21/6581 |
| | | | 725/19 |
| 2013/0081077 A1* | 3/2013 | Mauduit | G09C 5/00 |
| | | | 725/31 |
| 2013/0297727 A1* | 11/2013 | Levy | H04N 21/8358 |
| | | | 709/217 |
| 2014/0152786 A1* | 6/2014 | Nicholson | H04N 21/812 |
| | | | 348/61 |
| 2014/0201094 A1* | 7/2014 | Herrington | G06K 9/00577 |
| | | | 705/317 |
| 2015/0089526 A1* | 3/2015 | Gordon | H04N 21/278 |
| | | | 725/19 |
| 2015/0127340 A1* | 5/2015 | Epshteyn | G10L 15/26 |
| | | | 704/235 |
| 2015/0161587 A1* | 6/2015 | Khan | G06Q 20/3223 |
| | | | 705/44 |
| 2016/0338120 A1* | 11/2016 | Boyle | H04L 65/1069 |
| 2017/0094351 A1* | 3/2017 | Gordon | H04N 21/23892 |
| 2018/0302672 A1* | 10/2018 | Gordon | H04N 21/278 |
| 2018/0302673 A1* | 10/2018 | Gordon | H04N 21/254 |
| 2018/0310058 A1* | 10/2018 | Gordon | H04N 21/278 |
| 2020/0068256 A1* | 2/2020 | Gordon | H04N 21/812 |
| 2020/0068257 A1* | 2/2020 | Gordon | H04N 21/44213 |
| 2020/0068258 A1* | 2/2020 | Gordon | H04N 21/4722 |
| 2020/0068259 A1* | 2/2020 | Gordon | H04N 21/6581 |
| 2020/0068260 A1* | 2/2020 | Gordon | H04N 21/254 |

* cited by examiner

MEDIA CONTENT PROOF OF PLAY OVER OPTICAL MEDIUM

BACKGROUND

In the absence of being physically present to verify playback of media content, it is difficult if not impossible for a vendor to provide proof that the media content was actually displayed on a display device, digital signage, television, etc.

Verification can be needed by a content provider for a variety of reasons, such as: licensing, advertising revenue, government regulations (when consumers are required to view an informational notice), etc.

At present, mechanisms that provide the audit information is typically a processing log or history for the processing device where the content is processed for display. However, even if a processing log or history provides evidence that content was played on a device, the actual display may malfunction from time to time or because of an undetected software/hardware issue where in a given situation the content may not actually display on a display device. In fact, there is no existing reliable way to provide a true verification from existing processing logs or histories. This presents a number of issues for the content vendors and for the enterprises that are tasked with displaying the content on display devices for contractual and/or governmental compliance reasons.

For example, if the content was critical to a customer and the customer repudiates that the content was displayed for viewing, the processing log when presented may not be enough to rebut the customer's repudiation because display devices can malfunction and a undetectable bug in the software, associated with rendering the content on a display, may only occur in situations that cannot be readily reproduced or that are unable to be discovered in a reasonable time frame during which the dispute needs resolved. As a result, even if a customer was dishonest in the repudiation, the customer may be able to avoid paying for the content even when the content was actually displayed, which is a less than ideal situation for content vendors responsible for displaying the content.

SUMMARY

In various embodiments, methods and a system for content proof of play are presented.

According to an embodiment, a method for content proof of play is presented. More particularly, images of encoded information are received from an imaging sensor affixed to an external corner of a display while content is rendered on the display. The encoded information as is decoded as decoded information. The content is verified as having been rendered on the display based on the decoded information.

DETAILED DESCRIPTION

Figure 1:
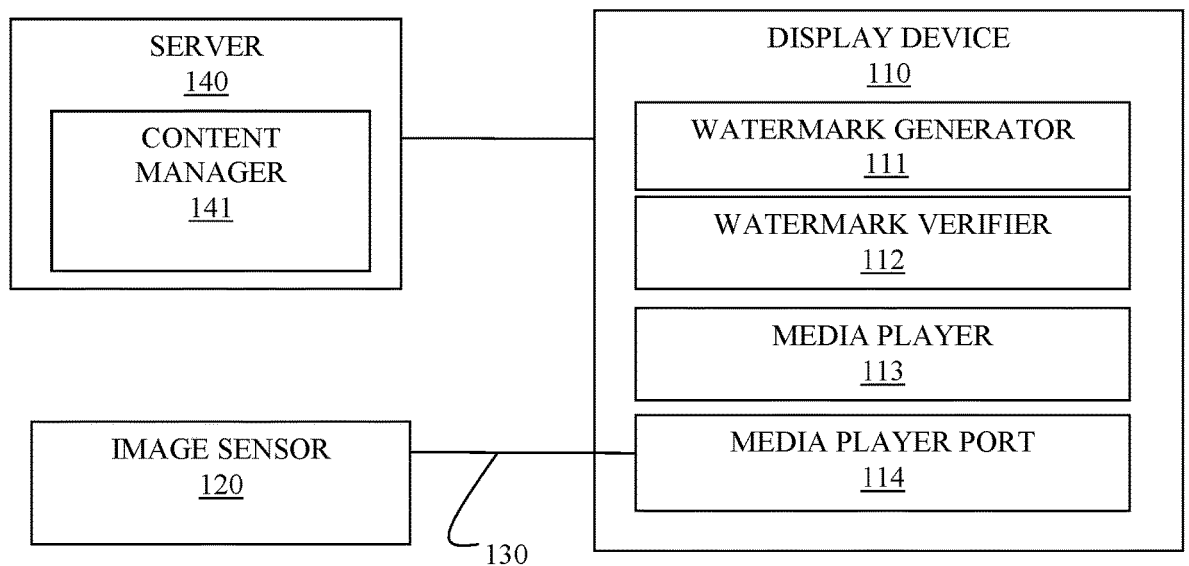
FIG. 1 is a diagram of a system for content proof of play over an optical media, according to an example embodiment.

FIG. 1 is a diagram of a system 100 for content proof of play processing, according to an example embodiment. The various components are illustrated and the arrangement of the components is presented for purposes of illustration only. It is to be noted that other arrangements with more or less components are possible without departing from the content proof of play teachings presented herein and below.

The techniques, methods, and system presented herein and below for content proof of play can be implemented in whole or in part in one, all, or some combination of the components shown with the system 100. The techniques and methods are programmed as executable instructions in memory and/or non-transitory computer-readable storage media and processed on one or more processors associated with the various components.

As used herein the terms "customer," "consumer," and "user" may be used synonymously and interchangeably.

As used herein the phrase and term "media content" and "content" may be used synonymously and interchangeably. The phrase and term refer to digital information being rendered on a display device and can include: video, images, animation, graphics, text, or a combination of video, images, animation, graphics, and text.

A "display device" as used herein refers to a device that includes a processor, memory, storage, software that executes on the processor, and at least one interfaced hardware display to which the content is visually rendered in one or more display screens within the display.

In an embodiment, the display device is: a digital sign, a television, or a processor-enabled display monitor.

The system 100 includes: a display device 110 having at least one hardware processor, memory, and non-transitory computer-readable storage. The processor of the device 110 executes executable instructions for software representing a watermark generator, a watermark verifier, and a media player 113. The display device 110 also includes a media player port 114.

The system 100 also includes an image sensor 120 interfaced to the display device 110 through a wired connection 130 to the port 114.

Furthermore, the system 100 includes an external server 140 having at least one hardware processor, memory, and non-transitory computer-readable storage. The processor of the server 140 executes executable instruction for software representing a content manager 141.

Initial configuration of the system 100, includes physically locating a field-of-view for a lens of the image sensor 120 in a predefined location external to a display surface of a display for the display device 110 and connecting the image sensor 120 to the display device 110 through the wired connection to the media player port 114. The image sensor's lens is directed to a specific small area of the display surface of the display.

The watermark generator 111 is configured to integrate into the processing flow of content display plans for content that is to be rendered on the display of the display device 110. When the content plans are installed the watermark generator 111 generates watermarks as visually displayable encoded codes, such as barcodes or Quick-Response (QR) codes. The encoded codes are intended to represent the content that is to be rendered on the display of the display device 110 in an encoded and compact code. When the watermarks are decoded, the watermarks represent the content that is to be rendered on the display. So, the watermark generator 111 generates the watermarks for the content of a content plan before the content is actually rendered in accordance with that plan on the display of the display device 110.

In an embodiment, the watermarks are integrated into the content as a portion of the content (modifying the original content with the watermarks).

In an embodiment, the watermarks are time sequenced with the content as a separate stream of data and a separate file from the content file associated with the content and the content plan.

The watermark generator 111 also ensures that the watermarks are either integrated into the content or streamed simultaneously with the content such that the watermarks play with the content when the content is rendered on the display of the display device 110 in a small area of the display to which the field-of-view of the image sensor 120 is directed.

When the media player 113 is invoked by a corresponding content plan with the content, the watermarks appear in a screen or overlaid screen such that the watermarks a visually captured by the image sensor 120 as images being played simultaneously with the content.

The image sensor 120 sends or streams the captured images of the watermarks during content play of the content to the watermark verifier 112 over the wired connection 130. The watermark verifier 112 can buffer or store the images in storage on the display device 110 with time and data stamps and a content plan identifier associated with the content plan of the content.

The watermark verifier 112 is configured to process the streamed watermarks by decoding the watermarks to verify the actual content that was rendered in screens of the display by the media player 113 by comparing the decoded watermarks to the content plan. Any missing watermarks are noted by the verifier 112 if present. If the decoded watermarks corresponding directly with the content of the content play, such is noted as well.

The watermark verifier 112 can be configured to verify the watermarks with the content of a given content plan: dynamically as the content is rendered on the display, at predefined intervals of time, at a concluding of content play for a given content plan, and/or on demand when a request for verification to a given content play is made over a network connection by the content manager 141.

In an embodiment, the watermark verifier 112 does not verify the watermarks to the content of a given content plan; rather: 1) dynamically in real time, 2) at predefined intervals of time, 3) at the conclusion of content play for a given content play, and/or 4) on demand when a request is made by the content manager 141, the watermark verifier 112 provides a content plan identifier, the time and date stamps, and the watermarks to the content manager 141 over the network connection for remote verification of the content being played on the display of the display device 110.

In an embodiment, the verifier 112 can independently verify that the content was played (visually rendered on screens of the display for the display device 110), provide results associated with verification to the content manager 141 over the network connection, and provide the watermarks, time and date stamps, and associated content plan identifier for the content plan to the content manager 141 over the network connection. In this way, the content manager 141 can receive results and also independently verify the accuracy of the verifier's verification processing.

In an embodiment, the verifier 112 sends just results from the content proof of play verification to the manager 141 and provides the recorded watermarks used for the verification to the manager 141 if requested (on demand) by the manager 141 thereafter.

In an embodiment, the results include a content plan identifier, a date and time stamp, and an indication of success when the verifier 112 performed the content proof of play verification and when the verification was successful.

In an embodiment, the results include a content plan identifier, content segment identifiers for specific content segments, and time and date stamps where the content segment identifiers identify specific segments or portions of the content in the content plan where the verifier 112 was unable to verify that those portions of the content were actually played (rendered within one or more screens of the display for the display device 110).

The results also include a display device identifier for the display device 110 so that the manager 141 can specifically identify the display device 110 and associated establishment (location and entity) where the display device 110 is located. This is used because a the manager 141 may be responsible for providing proof of content play for a plurality of display devices 110 of a same entity or a plurality of display devices 110 associated with a plurality of different entities.

In an embodiment, the content plan may logically divide the display of the display device 110 into panels, each panel including different content rendered by the media player 113 within different screens being rendered on the display. The watermarks being streamed in the predefined area of the display representing the content for each of the panels, such that the verifier 112 or the manager 141 can verify that all content for all panels were played by the media player 113.

In an embodiment, the media player port is a 3.5 mm audio jack to the media player 113.

In an embodiment, the display device 110 is a digital sign.

In an embodiment, the display device 110 is a television.

In an embodiment, the image sensor 120 is attached to one bottom or top corner of the display device 110 on the exterior housing of the display for the display device 110. In an embodiment, the image sensor 120 is attached with tape or glue. In an embodiment, the image sensor 120 is attached by a clip mechanism.

These embodiments and other embodiments are now discussed with reference to the FIGS. 2-4.

Figure 2:
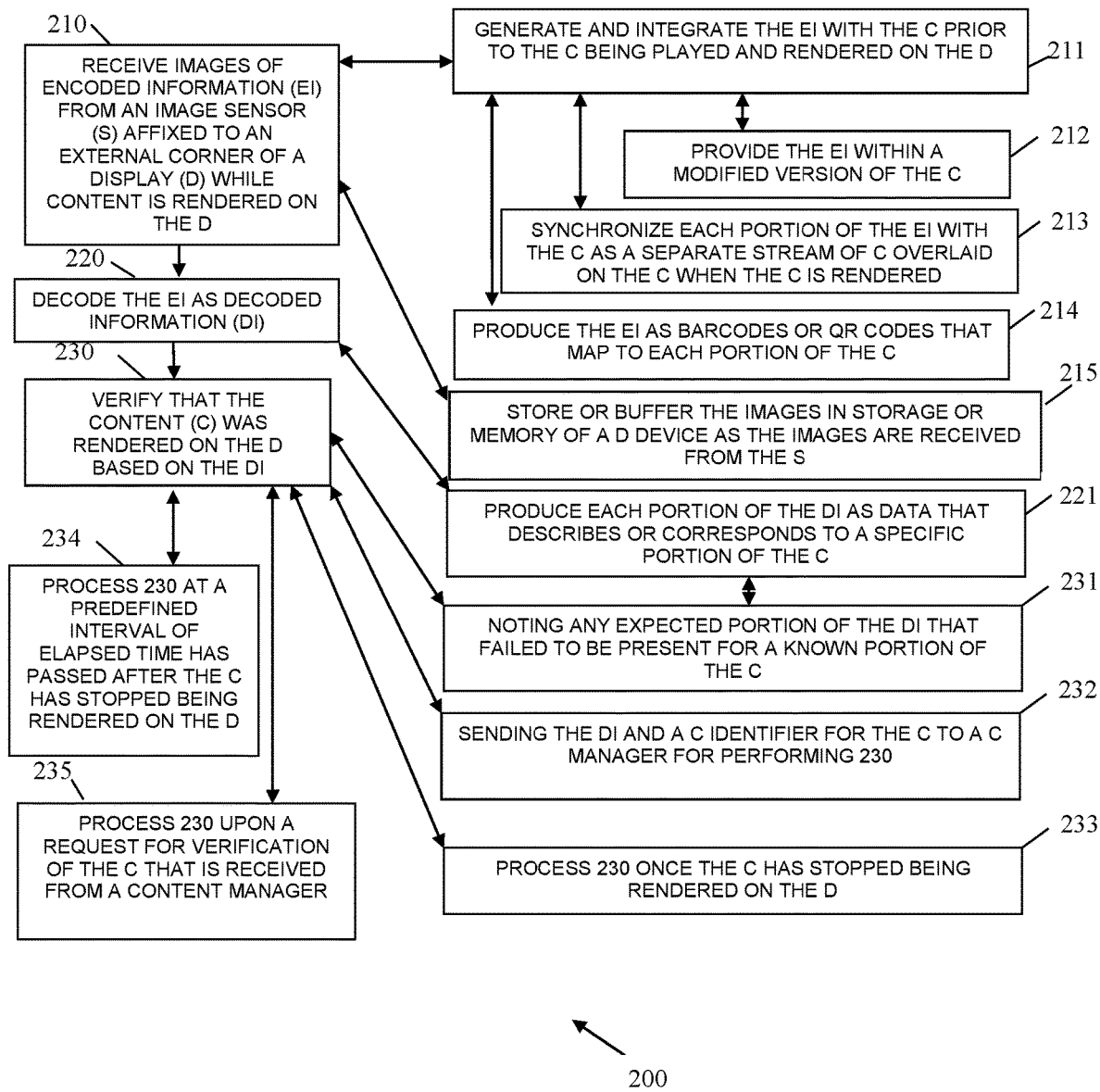
FIG. 2 is a diagram of a method for content proof of play, according to an example embodiment.

FIG. 2 is a diagram of a method 200 for content proof of play processing, according to an example embodiment. The software module(s) that implements the method 200 is referred to as a "proof of play verifier." The proof of play verifier is implemented as executable instructions programmed and residing within memory and/or a non-transitory computer-readable (processor-readable) storage medium and executed by one or more processors of a device. The processor(s) of the device that executes the proof of play verifier are specifically configured and programmed to process the proof of play verifier. The proof of play verifier has access to one or more networks during its processing. The networks can be wired, wireless, or a combination of wired and wireless.

In an embodiment, the proof of play verifier is both of, one of, or a combination of 111 and/or 112.

In an embodiment, the device that executes the proof of play verifier is the display device 110. In an embodiment, the display device 110 is a digital sign. In an embodiment, the display device 110 is a television.

At 210, the proof of play verifier receives images of encoded information from an image sensor affixed to an external corner of a display while content is rendered or played on the display. In an embodiment, the image sensor is the image sensor 120.

According to an embodiment, at 211, the proof of play verifier generates and integrates the encoded information with the content prior to the content being played or rendered on the display.

In an embodiment of 211 and at 212, the proof of play verifier provides the encoded information with a modified version of the content that includes the encoded information.

In an embodiment of 211 and at 213, the proof of play verifier synchronizes each portion of the encoded information with the content as a separate stream of content that is overlaid on the content when the content is rendered or played on the display.

In an embodiment of 211 and at 214, the proof of play verifier produces the encoded information as barcodes or QR codes that map to each portion of the content.

In an embodiment, at 215, the proof of play verifier stores or buffers the images in storage or memory of a display device as images are received from the image sensor.

At 220, the proof of play verifier decodes the encoded information from the images as decoded information.

In an embodiment, at 221, the proof of play verifier produces each portion of the decoded information as data that describes or corresponds to a specific portion of the content. For example, the decoded information may indicate that segment one of length 10 seconds for a given content plan played at a specific time and date.

At 230, the proof of play verifier verifiers that the content was rendered on the display based on the decoded information.

In an embodiment of 221 and 230, at 231, the proof of play verifier notes or records any expected portion of the decoded information that failed to be present for a known portion of the content.

In an embodiment, at 232, the proof of play verifier sends the decoded information and a content identifier for the content to a content manager for performing the verification processing at 230.

In an embodiment, at 233, the proof of play verifier processes the verification processing at 230 once the content has stopped being rendered or played on the display. This may be triggered by a notification sent from or a state obtained for the media player that is playing the content indicating that the content is done being played by the media player.

In an embodiment, at 234, the proof of play verifier processes the verification processing at 230 at a predefined interval of elapsed time has passed after the content has stopped being rendered or played on the display. For example, every 30 seconds or minute after the media player has stopped playing the content.

In an embodiment, at 235, the proof of play verifier process the verification processing at 230 upon an on-demand request for verification of the content that is received from a content manager. In an embodiment, the content manager is the content manager 141 or the method 300 described below.

Figure 3:
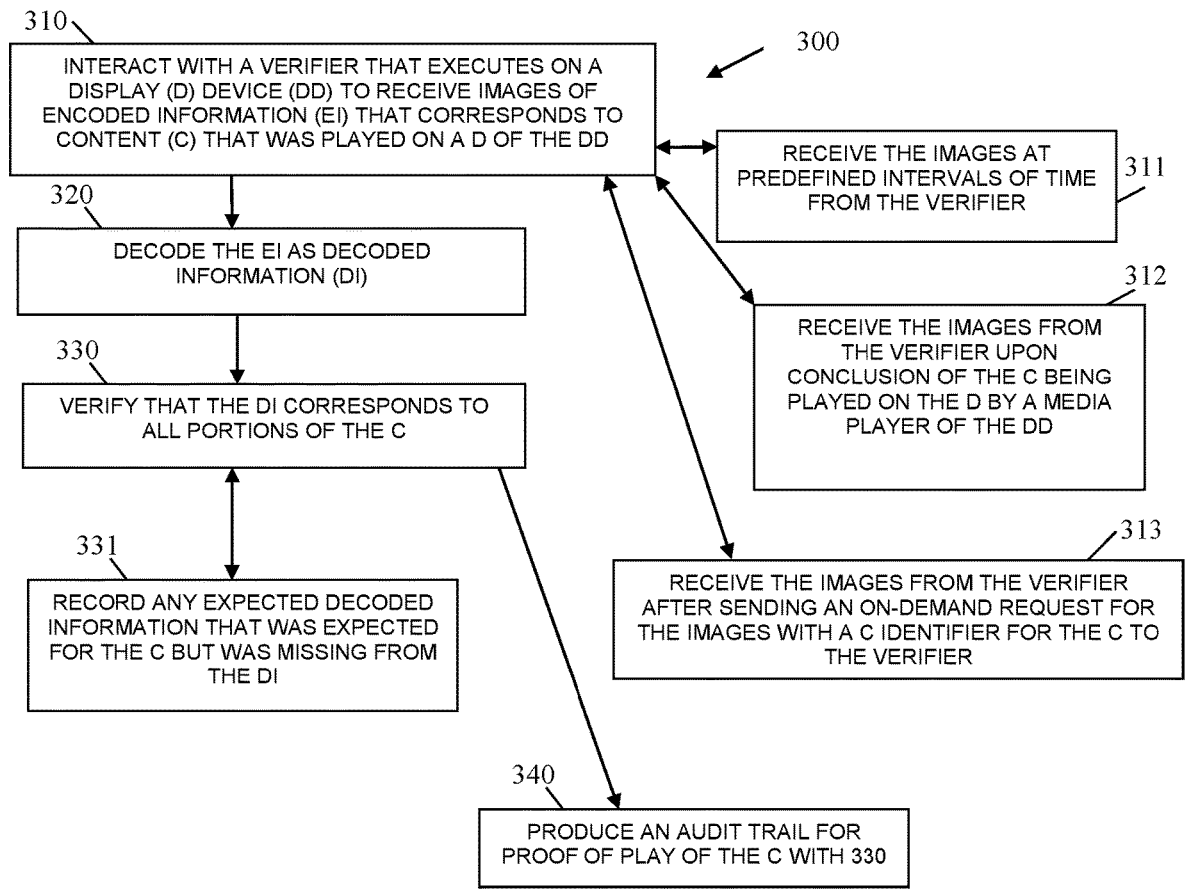
FIG. 3 is a diagram of another method for content proof of play, according to an example embodiment.

FIG. 3 is a diagram of another method 300 for proof of play processing, according to an example embodiment. The software module(s) that implement the method 300 is referred to herein as a "content manager." The content manager is implemented as executable instructions and programmed within memory and/or a non-transitory computer-readable (processor-readable) storage medium that executes on one or more processors of a device. The processors of the device are specifically configured to execute the content manager. The content manager has access one or more networks; the networks can be wired, wireless, or a combination of wired and wireless.

In an embodiment, the content manager is the content manager 141.

In an embodiment, the device that executes the content manager is the server 140.

In an embodiment, the device that executes the content manager is a cloud processing environment.

At 310, the content manager interacts with a verifier that executes on a display device to receive images of encoded information that corresponds to or describes content that was played on a display of the display device. In an embodiment, the verifier is the verifier 112 or the method 200.

In an embodiment, at 311, the content manager receives the images at predefined intervals of time from the verifier. For example, 30 seconds or a minute after the content has stopped being played by a media player of the display device.

In an embodiment, at 312, the content manager receives the images from the verifier upon conclusion of the content being played on the display by a media player of the display device.

In an embodiment, at 313, the content manager receives the images from the verifier after first sending an on-demand request for the images with a content identifier for the content to the verifier.

At 320, the content manager decodes the encoded information from the images as decoded information.

At 330, the content manager verifies that the decoded information corresponds to or describes all portions of the content that was played on the display of the display device.

In an embodiment, at 331, the content manager records any expected decoded information that was expected for the content but was missing from the decoded information. This indicates that some portions of the content did not properly display when played on the display of the display device.

According to an embodiment, at 340, the content manager produces an audit trail and non-repudiated proof of play of the content with the verification processing of 330 when all portions of the content were verified through the decoded information as having been played to the display of the display device.

Figure 4:
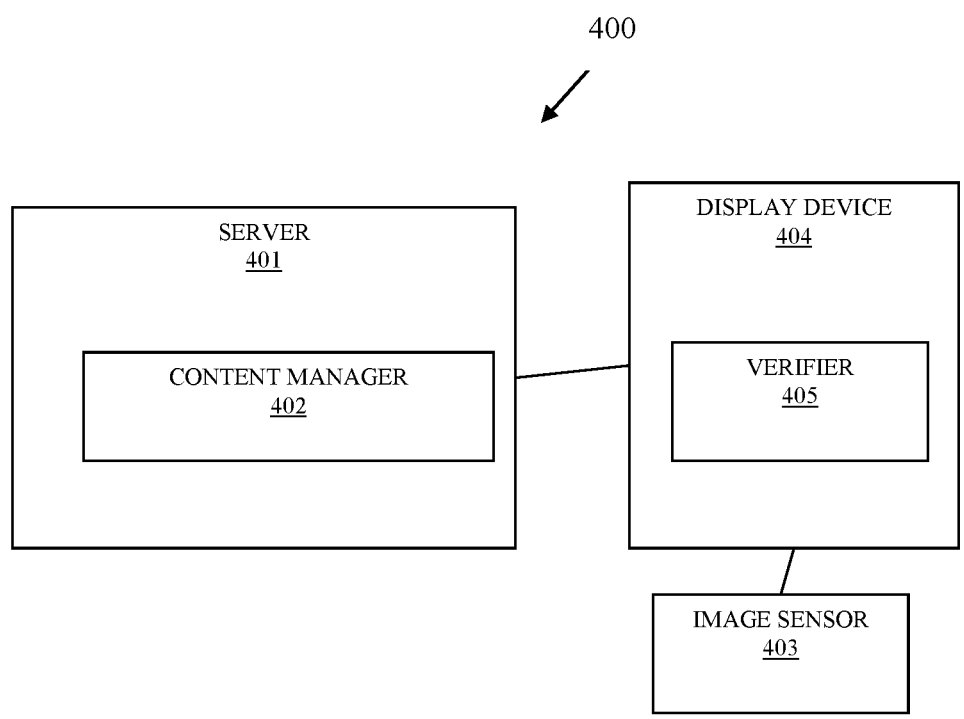
FIG. 4 is a diagram of another system for content proof of play, according to an example embodiment.

FIG. 4 is a diagram of another system 400 for proof of play processing, according to an example embodiment. The components of the system 400 are programmed and reside within memory and/or a non-transitory computer-readable medium and execute on one or more processors of the devices of the system 400. The system 400 also has access and can communicate over one or more networks; and the networks can be wired, wireless, or a combination of wired and wireless.

The system 400 is configured and programmed to perform the processing discussed above with the FIGS. 1-3.

The system 400 includes a server 401, a content manager 402, an image sensor 403, a display device 404, and a verifier 405.

In an embodiment, the display device 404 is the display device 110. In an embodiment, the display device 110 is a digital sign. In an embodiment, the display device 110 is a television.

In an embodiment, the verifier 405 is all or some combination of: the watermark generator 111, the watermark verifier 112, and/or the method 200.

In an embodiment, the external image sensor 403 is the image sensor 120.

In an embodiment, the server 401 is the server 140.

In an embodiment, the server 401 is part of a cloud processing environment.

In an embodiment, the content manager 402 is all of or some combination of: the content manager 141 and/or the method 300.

The image sensor 403 is affixed to an external surface of a display of the display device 404. The image sensor 403 is configured to capture images of watermarks being rendered in a predefined area of the display when content is played or rendered within the display.

The verifier 405 executes on at least one hardware processor of the display device 404 and is configured to: (i) receive images of the watermarks from the image sensor 403 when the content is played or rendered on the display, (ii) store the images in storage of the display device 404, and (iii) facilitate verification with the content manager 402 that all of the content was played or rendered on the display based on the images of the watermarks.

The content manager 402 executes on at least one hardware processor of the server 401 and is configured to: (i) interact with the verifier 405 to determine whether any portion of the content was not played or not rendered on the display and (ii) establish an audit trail as non-repudiated proof of playing or rendering of the content based on the interactions with the verifier 405 and the images of the watermarks.

In an embodiment, the verifier 405 processes the images to determine whether all portions of the content was played or rendered on the display of the display device 404.

In an embodiment, the content manager 402 processes the images to determine whether all portions of the content was played or rendered on the display of the display device 404.

In an embodiment, both the verifier 405 and the content manager 402 both independently process the images to independently determine whether all portions of the content was played or rendered on the display of the display device 404.

It should be appreciated that where software is described in a particular form (such as a component or module) this is merely to aid understanding and is not intended to limit how software that implements those functions may be architected or structured. For example, modules may be illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors of a single device, or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
generating encoded information for content;
synchronizing each portion of the encoded information with content portions of the content and providing synchronized encoded information as a separate stream of information that is synchronized to the content portions, wherein the separated stream is overlaid on the content when the content is rendered on a display;
receiving images of encoded information from an imaging sensor affixed to an external corner of the display while content is rendered on the display based on presentation of the encoded information in the images as overlaid on the content and being played with the separate stream of the information with the content on the display and captured and provided by the imaging sensor;
decoding the encoded information from the images as decoded information; and
verifying that the content was rendered on the display based on the decoded information, wherein verifying further includes verifying that each piece of the content was properly rendered within a specific screen of several screens rendered on the display from the decoded information.

2. The method of claim 1, wherein generating further includes generating the encoded information as barcodes or Quick Response (QR) codes that map to each content portion of the content.

3. The method of claim 1, wherein receiving further includes storing or buffering the images in storage or memory of a display device as the images are received from the sensor.

4. The method of claim 1, wherein decoding further includes producing each portion of the decoded information as data that describes or corresponds to a specific portion of the content.

5. The method of claim 4, wherein verifying further includes noting any expected portion of the decoded information that failed to be present for a known portion of the content.

6. The method of claim 1, wherein verifying further includes sending the decoded information and a content identifier for the content to a content manager for performing the verifying.

7. The method of claim 1, wherein verifying further includes processing the verifying once the content has stopped being rendered on the display.

8. The method of claim 1, wherein verifying further includes processing the verifying at a predefined interval of elapsed time has passed after the content has stopped being rendered on the display.

9. The method of claim 8, wherein verifying further includes processing the verifying upon a request for verification of the content that is received from a content manager.

10. A method, comprising:
interacting with a verifier that executes on a display device to receive images of encoded information that corresponds to content that was played on a display of the display device, wherein the encoded information is a separate stream of information that is synchronized with content portions of the content and the separate stream of information is overlaid on to the content and synchronized with the content while the content is played on the display;

decoding the encoded information from the images as decoded information; and verifying that the decoded information corresponds to all portions of the content, wherein verifying further includes verifying that each piece of the content was properly rendered within a specific screen of several screens rendered on the display device from the decoded information.

11. The method of claim 10, wherein interacting further includes receiving the images at predefined intervals of time from the verifier.

12. The method of claim 10, wherein interacting further includes receiving the images from the verifier upon conclusion of the content being played on the display by a media player of the display device.

13. The method of claim 10, wherein interacting further includes receiving the images from the verifier after sending an on-demand request for the images with a content identifier for the content to the verifier.

14. The method of claim 10, wherein verifying further includes recording any expected decoded information that was expected for the content but was missing from the decoded information.

15. The method of claim 10 further comprising, producing an audit trail for proof of play of the content with the verifying.

16. A system, comprising:
a server configured to execute a content manager;
a display device configured to execute a verifier; and
an image sensor affixed to an external surface of a display of the display device, wherein the image sensor configured to capture images of watermarks being rendered in a predefined area of the display when content is played or rendered within the display, wherein the watermarks are provided in a separate stream of information from the content and the watermarks are synchronized with content portions of the content; the separate stream of information is rendered over the content on this display as the content plays on the display;

wherein the verifier is configured to: (i) receive images of the watermarks from the image sensor when the content is played or rendered on the display, (ii) store the images in storage of the display device, and (iii) facilitate verification with the content manager that all of the content was played or rendered on the display based on the images of the watermarks and verify that each piece of the content was properly rendered within a specific screen of several screens rendered on the display device from the decoded information;

wherein the content manager is configured to: (i) interact with the verifier to determine whether any portion of the content was not played or not rendered on the display and (ii) establish an audit trail of playing or rendering of the content based on the interactions with the verifier and the images of the watermarks.

17. The system of claim 16, wherein one or more of:
the verifier is configured to process the images in order to determine whether all portions of the content was played or rendered on the display, and the content manager is configured to process the images in order to determine whether all portions of the content was played or rendered on the display.

* * * * *